United States Patent
Arjun et al.

(10) Patent No.: US 10,855,682 B2
(45) Date of Patent: Dec. 1, 2020

(54) VIRTUAL ADDRESS FOR CONTROLLER IN A CONTROLLER CLUSTER

(71) Applicant: Hewlett Packard Enterprise Development LP, Houston, TX (US)

(72) Inventors: Vinod Arjun, Bangalore (IN); Suryanarayanan Devarajan, Sunnyvale, CA (US); Isaac Theogaraj, Bangalore (IN); Sheausong Yang, Sunnyvale, CA (US); Kavitha Kamarthy, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 199 days.

(21) Appl. No.: 16/068,783

(22) PCT Filed: Sep. 15, 2016

(86) PCT No.: PCT/US2016/051848
§ 371 (c)(1),
(2) Date: Jul. 9, 2018

(87) PCT Pub. No.: WO2017/127138
PCT Pub. Date: Jul. 27, 2017

(65) Prior Publication Data
US 2019/0020656 A1  Jan. 17, 2019

(30) Foreign Application Priority Data

Jan. 22, 2016 (IN) .............................. 201641002601

(51) Int. Cl.
*H04L 29/06* (2006.01)
*H04L 29/08* (2006.01)
*H04L 29/14* (2006.01)

(52) U.S. Cl.
CPC ...... *H04L 63/0884* (2013.01); *H04L 63/0892* (2013.01); *H04L 67/1002* (2013.01);
(Continued)

(58) Field of Classification Search
CPC ............. H04L 63/0884; H04L 67/1002; H04L 67/142; H04L 69/40; H04L 67/1023; H04L 41/0663; H04L 41/0668
See application file for complete search history.

(56) References Cited

U.S. PATENT DOCUMENTS 6,691,165 B1 * 2/2004 Bruck ............... H04L 29/12009
709/227
7,516,202 B2  4/2009 Yu et al.
(Continued)

FOREIGN PATENT DOCUMENTS

WO  WO-2015137977  9/2015

OTHER PUBLICATIONS

Netgear, "What are VRRP N:1 Redundancy Concepts for my ProSAFE Wireless Controller WC7600?" Jul. 31, 2014, http://kb.netgear.com/app/answers/detail/a_id125435/~/what-are-vrrp-n%3A1-redundancy-concepts-for-my-prosafe-wireless-controller-wc7600%3F.
(Continued)

*Primary Examiner* — Paul E Callahan
(74) *Attorney, Agent, or Firm* — Hewlett Packard Enterprise Patent Department

(57) ABSTRACT

Examples described herein include a method and system for determining a number of controllers in a Network Authentication Server (NAS) controller cluster, wherein each of the controllers in the NAS controller cluster includes a unique Physical Internet Protocol (PIP) address; creating a number of unique Virtual Internet Protocol (VIP) addresses for use by an external authentication server (EAS) to communicate
(Continued)

with the controllers in the NAS controller cluster, wherein the number of VIP addresses is to be proportional to the number of PIP addresses; and mapping each controller in the NAS controller cluster to a plurality of VIP addresses, wherein the VIP addresses are to have different priorities for different controllers in the NAS controller cluster.

20 Claims, 7 Drawing Sheets

(52) U.S. Cl.
CPC .............. *H04L 67/42* (2013.01); *H04L 69/40* (2013.01); *H04L 67/1023* (2013.01)

(56) References Cited

U.S. PATENT DOCUMENTS

| | | |
|---|---|---|
| 7,656,788 B2 | 2/2010 | Ma et al. |
| 8,499,336 B2 | 7/2013 | Alex et al. |
| 8,806,580 B2 | 8/2014 | Tirupachur et al. |
| 2005/0141499 A1 | 6/2005 | Ma et al. |
| 2013/0159487 A1 | 6/2013 | Patel et al. |
| 2013/0188514 A1 | 7/2013 | Jain |
| 2014/0223511 A1 | 8/2014 | Yamamoto et al. |

OTHER PUBLICATIONS

PCT International Search Report in Appl. No. PCT/US20161051848 dated Dec. 27, 2016; 3 pages.

\* cited by examiner

VIRTUAL ADDRESS FOR CONTROLLER IN A CONTROLLER CLUSTER

BACKGROUND

In some computer networks, network devices can be granted or denied access to a protected network resource, such as a server, printer, data, etc., by a network access server (NAS) or other network access entity. An NAS can, for example, be programmed to communicate with another resource, such as an external authentication server (EAS) to determine whether certain access credentials supplied by the client are valid. Access credentials can, for example, be in the form of a username and password, security certificate, and/or another suitable credential. Based on its communication with the EAS, the NAS can then allow or disallow access to the network resource.

DETAILED DESCRIPTION

Figure 1:
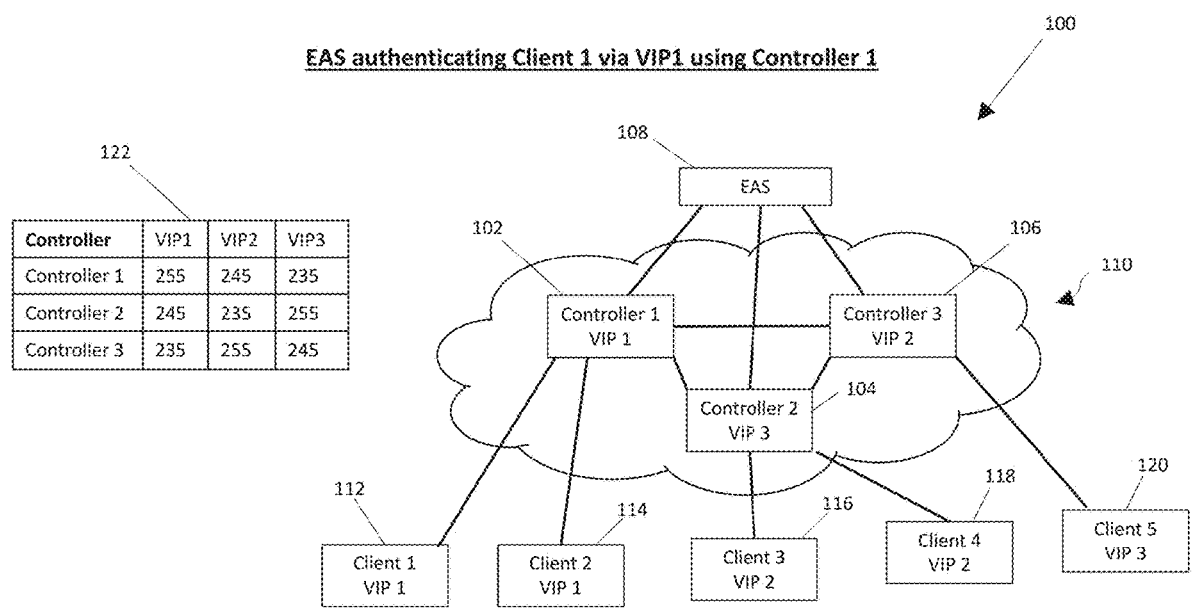
FIG. 1 is a diagram of a network in a first configuration, according to an example.

The following discussion is directed to various examples of the disclosure. Although one or more of these examples may be preferred, the examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. Throughout the present disclosure, the terms "a" and "an" are intended to denote at least one of a particular element. In addition, as used herein, the term "includes" means includes but not limited to, the term "including" means including but not limited to. The term "based on" means based at least in part on.

In some networks, client devices can be granted or denied access to a protected network resource by the use of a local Network Access Server (NAS) and an External Authentication Server (EAS). Moreover, in some networks, a NAS controller cluster can be provided in which multiple controllers can, for example, be deployed to provide redundancy for Access Points (APs) and clients. In some cluster environments, an active controller and a standby controller can be assigned from available controllers in the cluster. The active controller can act as an NAS and can, for example, perform a client authentication process with the EAS. During such an authentication process, the active controller can, for example, notify the EAS of the active controller's Internet Protocol (IP) address to be used as the IP address for the NAS for purposes of communication with the EAS.

In some situations, the active controller may fail and the client may be automatically reassigned to the standby controller. Depending on the type of failure, deauthentication between the failed active controller and the EAS may not be performed and there may be no other automatic mechanism to update the EAS with the IP address of the standby controller (i.e., the new NAS IP address). This can become an issue in situations such as where the EAS attempts to initiate a request to change a property or state of the client after failure of the active controller. Such requests can, for example, include Remote Authentication Dial-In User Service (RADIUS) Change of Authorization/Disconnect or Extensible Markup Language (XML) add/authenticate/delete commands. In such a situation, such requests may be erroneously sent to the failed controller rather than to the new active controller.

Certain implementations of the present disclosure can leverage the use of virtual addresses for controllers in a NAS controller cluster in order to address one or more of the issues described above or other issues. For example, in some implementations, a method can include: (a) determining a number of controllers in a NAS controller cluster, wherein each of the controllers in the NAS controller cluster includes a unique Physical Internet Protocol (PIP) address; (b) creating a number of unique Virtual Internet Protocol (VIP) addresses for use by an EAS to communicate with the controllers in the NAS controller cluster, wherein the number of VIP addresses is to be proportional to the number of PIP addresses; and (c) mapping each controller in the NAS controller cluster to a plurality of VIP addresses, wherein the VIP addresses are to have different priorities for different controllers in the NAS controller cluster.

Certain implementations of the present disclosure can scale and perform better than existing IP virtualization techniques for use with NAS controller clusters. For example, in some implementations, the number of virtual IP addresses created can be selected to be the same as the number of controllers in the cluster. This can, for example, provide a performance advantage with N-1 times more parallelism for a controller cluster size of N compared to a single VIP approach. Such "parallelism" can, for example, be achieved, due to usage of N VIPs, by having different controllers receive messages from an external authentication server (such as a Change of Authorization (CoA)) as opposed to having a single controller interfacing with the external authentication server and relaying the messages to other controllers. Other advantages of implementations presented herein will be apparent upon review of the description and figures.

FIG. 1 is a diagram of an example network 100 including various example network nodes in communication via data communication paths (shown as straight lines connecting the nodes). The example network nodes depicted in FIG. 1 include an example EAS 108, three example controllers 102, 104, and 106 (which together form an example NAS controller cluster 110), and a plurality of example client devices 112, 114, 116, 118, and 120. FIG. 1 further depicts a data structure 122 for use by the controllers in cluster 110 that identifies respective priorities for VIP addresses for each controller in cluster 110. The example nodes of network 100, data structure 122, and other characteristics of network 100 are described in further detail below.

Network nodes within network 100 can forward network traffic along a datapath based on metadata within the traffic. For example, traffic in the form of a packet can be received at controller 102 (or another node in network 100). For consistency, the industry term "packet" is used throughout this description, however, it is appreciated that the term "packet" as used herein can refer to any suitable protocol data unit (PDU). Such a packet can, for example, include payload data as well as metadata in the form of control data. Control data can, for example, provide data to assist the network node with reliably delivering payload data. For example, control data can, for example, refer to network addresses for one or more client devices, source and/or destination nodes, error detection codes, sequencing information, size of the packet, a time-to-live (TTL) value, etc. In contrast, payload data can, for example, refer to data carried on behalf of an application for use by client devices or one or more source and/or destination nodes.

The term "cluster" as used herein can, for example refer to a set of connected computing devices (e.g., controllers 102, 104, 106, which can for example be in the form of all-in-one computers, servers, etc.) that work together such that in some respects they can be viewed as a single system. Each node of such a cluster can, for example, be programmed to perform a same task, such as acting as a controller (e.g., a NAS controller) and can be controlled and scheduled by software. For example, in some implementations, multiple controllers (e.g., controllers 102, 104, and 106) with NAS functionality can be deployed to provide redundancy for Access Points (APs) and clients. In some situations, this can be provided through the use of an active-active (load-sharing) model. Moreover, each node of such a cluster can, for example, be connected to each other through local area networks (LAN) (or another suitable type of network depending on the use of the cluster), with each node running its own instance of an operating system. The various nodes of such a cluster can have the same operating system and hardware, or can in some implementations have different operating systems and/or different hardware.

In cluster 110, an active NAS controller (controller 102 in this example) and a standby NAS controller (controller 104 in this example) can be assigned from available controllers in cluster 110. The active controller can act as an NAS for a client device (e.g., client 1 at 112) and can, for example, perform a client authentication process with the EAS, whereas the standby controller can be programmed to act as an NAS for the client device in the event that the active controller fails or is otherwise out of operation (or in response to a manual select by a network administrator or another triggering event).

It is appreciated that, in some implementations, a first controller (e.g., controller 1 at 102) of cluster 110 can be programmed to act as an active controller for a first client device (e.g., client 1 at 112) and can be programmed to act as a standby controller for a second client device (e.g., client 3 at 116). Likewise, in some implementations, a second controller (e.g., controller 2 at 114) can be programmed to act as an active controller for the second client device and can be programmed to act as a standby controller for the first client device. That is, cluster 110 can include multiple different controllers, each of which can act as an active controller for certain clients and as standby controllers for other clients. Control instructions for the nodes of cluster 110 (e.g., the assignment of certain cluster controllers as active or standby NAS controllers for certain clients) can be provided by one or more nodes within the cluster (e.g., one or more controllers within cluster 110), or, in some situations, by a node outside the cluster (e.g., a computer in data communication with the controller cluster). Moreover, control instructions can include instructions beyond the assignment of active or standby NAS controllers, such as routing instructions to meet customer use cases, such as to achieve a desired throughput (or another Quality of Service (QoS)) over network 100, enforce security provisions for network 100, or provide another suitable service or functionality.

The functionality of controllers within cluster 110 can, for example, be implemented in part via a software program on a standalone machine, such as a standalone server. In some implementations, the controllers of cluster 110 can be implemented on one or more multi-purpose machines, such as a suitable desktop computer, server, laptop, tablet, or the like. In some implementations, the controllers of cluster can be implemented on one or more non-host network nodes, such as certain types of network switches. It is appreciated that the functionality of controllers may be split among multiple controllers or other devices. Likewise, the functionality of multiple controllers can be integrated within a single device, such as a single server that hosts multiple controllers.

Clients of network 100 can, for example, be in the form of network hosts or other types of network nodes. For example, such clients be in the form of suitable servers, desktop computers, laptops, printers, tablets, smart phones, etc. As but one example, a client can be in the form of a desktop computer including a monitor for presenting information to an operator and a keyboard and mouse for receiving input from an operator. It is appreciated that clients can be endpoint nodes on network 100, intermediate nodes between endpoint nodes, or positioned at other logical or physical locations within network 100. Moreover, FIG. 1 depicts clients as being connected to cluster 110 via a single data communication path (shown as straight lines connecting the nodes). However, it is appreciated that the clients may be connected to cluster 110 via one or more intermediary nodes. For example, in some implementations, a client device may be in the form of a smart phone that is wireless connected to a Wireless Access Point (WAP), the WAP being connected to cluster 110 via a wired connection. It is appreciated that any suitable network connection (wired or wireless) may be provided to allow access to cluster 110 by a given client device.

The term "intermediary nodes" can, for example refer to switches or other multi-port network bridges that process and forward data at the data link layer. In some implementations, one or more of the nodes of FIG. 1 (or other data forwarding nodes used in networks but not shown in FIG. 1) can be in the form of multilayer switches that operate at multiple layers of the Open Systems Connection (OSI) model (e.g., the data link and network layers). Although the term "network switch" is used throughout this description, it is appreciated that this term can refer broadly to other suitable network data forwarding devices. For example, a general purpose computer can include suitable hardware and machine-readable instructions that allow the computer to function as a network switch. It is appreciated that the term "switch" can include other network datapath elements in the form of suitable routers, gateways and other devices that provide switch-like functionality for network 100.

The various nodes within network 100 are connected via one or more data channels, which can, for example be in the form of data cables or wireless data channels. Although a single "link" (i.e., a single line connecting two nodes in FIG. 1) between each network node is illustrated, it is appreciated that each single link may include multiple wires or other wired or wireless data channels. Moreover, the lines of FIG. 1 can refer to logical communication channels between nodes in network 100. For example, it is appreciated that a given controller (e.g., controller 102) may be directly connected to only one or a few network nodes, while being indirectly connected to other nodes of network 100. As but one example, controller 102 can be directly connected to controller 104 via an Ethernet cable, while being indirectly connected to controller 106 (e.g., by relying on controller 102, a network switch, etc., as an intermediary for communication with controller 104). In such a situation, a communication channel between controller 102 and controller 106 may be considered a logical channel and may be formed by a first physical channel (e.g., a first Ethernet cable) that connects controller 102 to controller 104 and by a second physical channel (e.g., a second Ethernet cable) that connects controller 104 to controller 106.

In the example network 100 depicted in FIG. 1, devices may be directly networked together or may be networked together via one or more intermediary nodes (e.g., by one or more network switches). It is appreciated however, that the implementations described herein can be used or adapted for networks including more or fewer devices, different types of devices, and different network arrangements. It is further appreciated that the disclosure herein can apply to suitable Software-Defined Networks (SDNs). Such SDNs can, for example, be in the form of a homogeneous SDN In which each device is controlled by an SDN controller, and/or certain hybrid or heterogeneous SDNs in which some devices are controlled by an SDN controller and some devices are not controlled by the SDN controller.

Figure 2:
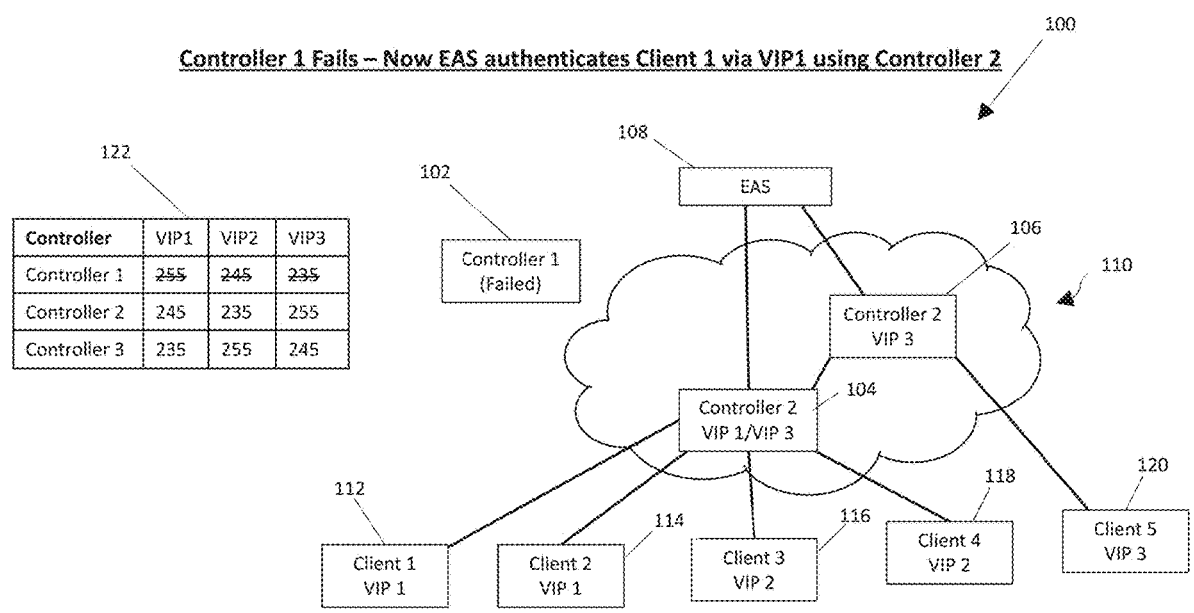
FIG. 2 is a diagram of the network of FIG. 1 in a second configuration, according to an example.

FIG. 2 illustrates a flowchart for a method 124 according to an example of the present disclosure. For illustration, the description of method 124 and its component steps make reference to example network 100 and elements thereof, such as for example controllers 102, 104, 106, EAS 108, etc. However, it is appreciated that method 124 or aspects thereof can be used or otherwise applicable for any suitable network or network element described herein or otherwise. For example, method 124 can be applied to computer networks with different network topologies than those illustrated in FIG. 1.

In some implementations, method 124 can be implemented or otherwise executed through the use of executable instructions stored on a memory resource (e.g., the memory resource of the system of FIG. 5), executable machine readable instructions stored on a storage medium (e.g., the medium of FIGS. 6 and 7), in the form of electronic circuitry (e.g., on an Application-Specific Integrated Circuit (ASIC)), and/or another suitable form. Although the description of method 124 herein primarily refers to steps performed on controller 102 for purposes of illustration and clarity, it is appreciated that in some implementations, method 124 can be executed on another computing device within network 100 or in data communication with controller 102.

A brief overview of an example implementation of method 124 is provided below, with each block of method 124 being described in further detail in its respective section. The implementation of method 124 depicted in FIG. 2 includes determining (at block 126) a number of controllers (e.g., controllers 102, 104, and 106) in an NAS controller cluster (e.g., cluster 110), with each controller in NAS controller cluster 110 including a unique PIP address. The method of FIG. 2 further includes creating (at block 128) a number of unique VIP addresses for use by an EAS to communicate with the controllers in the NAS controller cluster, wherein the number of VIP addresses is to be proportional to the number of PIP addresses. The method of FIG. 2 further includes mapping (at block 130) each controller in the NAS controller cluster to a plurality of VIP addresses, wherein the VIP addresses are to have different priorities for different controllers in the NAS controller cluster. The various blocks of method 124 are described in further detail below.

As provided above, method 124 includes determining (at block 126) a number of controllers in cluster 110, wherein each of the controllers in the NAS controller cluster includes a unique PIP address. In the example network 100 of FIG. 1, cluster 110 includes three controllers (controllers 102, 104, and 106). As used herein, the term IP address can, for example, refer to a numerical label assigned to each device participating in a computer network that uses the Internet Protocol for communication. An IP address can, for example, be used for host or network interface identification as well as location addressing. IP addresses can, in some implementations, be defined by a 32-bit number (e.g., Internet Protocol Version 4 (IPv4)), a 128-bit number (IPv6)), or another suitable internet protocol addressing system. As used herein, the word "physical" used in the context of a PIP can refer to a logical address that is bound to a physical interface of a device via software, whereas the word "virtual" used in the context of a VIP can refer to a logical address assigned to a device in a virtualized network environment. In some respects, a PIP can be in the form of a static IP address. However, it is appreciated that in some situations, even a static IP address may change as a result of network administration. In some implementations, a MAC address or another suitable static address for a controller in cluster 110 may be substituted for a PIP as used with respect to method 124. In implementations where there are multiple levels of virtualization, the PIP address may refer to a virtualized IP address that is virtualized at a first level, and the VIP address may refer to a virtualized IP address that is virtualized at another level (e.g., at the controller cluster level).

In the example method 124 of FIG. 2, first controller 102 is to communicate with EAS 108 to provide network authentication services for client device 112. As provided above, EAS can be used in combination with controller 102 to determine whether certain access credentials supplied by client 112 are valid. Based on its communication with EAS 108, controller 102 (acting as an NAS) can then allow or disallow client 112 access to the network resource. EAS 108 can, for example, implement a RADIUS or other suitable networking protocol that provides centralized Authentication, Authorization, and Accounting (AAA) management for users who connect and use a network service. In certain implementations where EAS is a RADIUS server, authentication and authorization can be provided by controller 102 (acting as an NAS) sending a RADIUS Access Request message to EAS 108, requesting authorization to grant access via the RADIUS protocol. This request can, for example, include access credentials, such as a username and password, security certificate, and/or another suitable credential. EAS 108 can then checks that the information is correct using a suitable authentication scheme. The user's proof of identification can then be verified, along with, optionally, other information related to the request, such as the user's network address or phone number, account status, and specific network service access privileges. The RADIUS server then return a response to controller 102 rejecting access, challenging access, or accepting access. When access is accepted, the user may be granted access to the protected network resource. EAS 108 may further allow for accounting functionality. For example, in some implementations, such accounting can be used for statistical purposes and for general network monitoring.

In some implementations, client 112 may be connected to a first controller (e.g., controller 102) as an active controller to authenticate with EAS 108 and connected to a second controller (e.g., controller 104) as a standby controller to authenticate with EAS 108 in case the first controller fails. As used herein, the term "fail" can refer to an abnormal termination of a previously active application, server, system, hardware component, or network. The abnormal termination can be the result of a system crash of a controller, in which software or hardware stops functioning properly. In some implementations, the abnormal termination can be the result of a power loss of a controller or another component of network 100 or another suitable cause that causes abnormal termination. In the example method of FIG. 2, standby controller can serve as a failover controller for active controller. As used herein, the term "failover" can, for example, refer to a switching to a redundant or standby controller upon failure of an active controller. The switching can, in some implementations be performed automatically by software and in some implementations can be performed manually (e.g., by a network administrator).

As provided above, method 124 includes creating (at block 128) a number of unique VIP addresses for use by EAS 108 to communicate with the controllers in the NAS controller cluster. The creation of a VIP address can be performed by any suitable virtualization technique. The number of created VIP addresses can, in some implementations, be equal to the number of PIP addresses. For example, in the network of FIG. 1, three VIP addresses can be created to be equal to the three PIP addresses (and three controllers). In another implementation, the number of created VIP addresses can be less than the number of PIP addresses. For example, in the network of FIG. 1, two VIP addresses can be created. The exact number of VIP addresses to be created can be determined based to optimize administrative load, scalability, or other factors. For example, in some implementations, the number of VIP addresses can be proportional to the number of PIP addresses. As used herein, the term "proportional" can refer a number of VIP addresses that changes based on the number of PIP addresses (e.g., 10 PIP addresses and 10 VIP addresses; 5 PIP addresses and 5 VIP addresses) and can be distinguished from a static relationship (e.g., 1 VIP address for 5 PIP addresses and 1 VIP addresses for 10 PIP addresses). In one example, 2 constant VIP addresses may be used for each PIP for purposes of redundancy. It is appreciated that any suitable proportional relationship can be used (e.g., a linear proportional relationship where 3 VIP addresses are created for 6 PIP addresses and 5 VIP addresses are created for 10 PIP addresses). Suitable non-linear proportional relationships may also be used.

In some implementations, the number of created VIP addresses may further be based on a number of allowable concurrent transactions for EAS 108 from a single IP address. For example, the number of VIP addresses can be dynamically created such that the number of concurrent transactions for a given EAS from a single IP address is to be less than a number of allowable current transactions for the given EAS. For example, some RADIUS servers may not allow and/or be capable of more than 256 concurrent RADIUS transactions from a given NAS IP address. In such a situation, the number of created VIP addresses may be capped at 256 in order to comply with the maximum concurrent transactions value. It is appreciated that other suitable techniques may be used to arrive at an appropriate number of VIPs.

As provided above, method 124 includes mapping (at block 128) each controller in cluster 110 to a plurality of VIP addresses. Each VIP address can be associated with a different priority for each controller. In some implementations, the VIP addresses are to have different priorities for different controllers in cluster 110 such that a client connected to multiple controllers in cluster 110 is assigned to only a single active controller to provide network authentication services. For example, as shown in FIG. 1, the following priority mappings of data structure 122 can be provided as follows:

| Controller | VIP1 Priority | VIP2 Priority | VIP3 Priority |
|---|---|---|---|
| Controller 1 | 255 | 245 | 235 |
| Controller 2 | 245 | 235 | 255 |
| Controller 3 | 235 | 255 | 245 |

Figure 3:
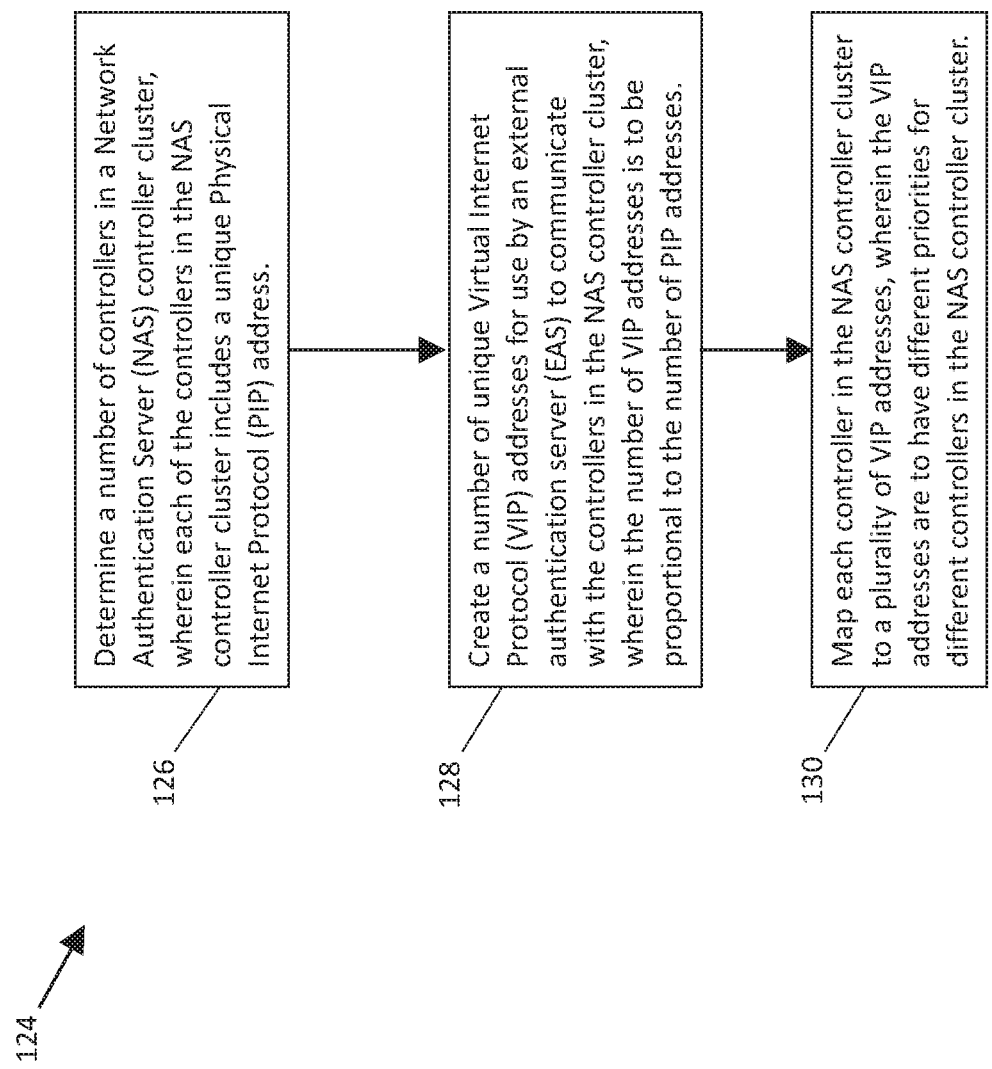
FIG. 3 is a flowchart for a method, according to an example.

In this mapping, controller 1 has the highest priority value for VIP 1 and therefore VIP 1 will be assigned to controller 1. Likewise, controller 3 has the highest priority value for VIP2 and therefore VIP2 will be assigned to controller 3. Finally, controller 2 has the highest priority value for VIP3 and therefore VIP3 will be assigned to controller 2. In some implementations, the priorities can be determined by each controller (or another entity, such as by a network administrator, by datapath nodes themselves, etc.) based on one or more static parameters (e.g., link speeds, number of hops between nodes, etc.) and can further (or alternatively) be based on one or more dynamic parameters (e.g., QoS, network latency, network throughput, network power consumption, etc.). FIG. 3 is a diagram of the network of FIG. 1 in a second configuration, according to an example. In FIG. 3, controller 1 at 102 has failed and now controller cluster 110 includes controller 2 at 104 and controller 3 at 106. Upon failure of controller 1 at 102, the various communication channels connected to controller 1 can be disabled and client 1 can be automatically connected to controller 2. With controller 1 disabled, priority mappings of data structure 122 can be updated as follows:

| Controller | VIP1 Priority | VIP2 Priority | VIP3 Priority |
|---|---|---|---|
| ~~Controller 1~~ | ~~255~~ | ~~245~~ | ~~235~~ |
| Controller 2 | 245 | 235 | 255 |
| Controller 3 | 235 | 255 | 245 |

In this mapping controller 2 has the highest priority value for both VIP 1 and VIP 3 and therefore VIP 1 will be assigned to controller 1. Likewise, controller 3 has the highest priority value for VIP2 and therefore VIP2 will continue to be assigned to controller 3.

Although the flowchart of FIG. 2 shows a specific order of performance, it is appreciated that this order may be rearranged into another suitable order, may be executed concurrently or with partial concurrence, or a combination thereof. Likewise, suitable additional and/or comparable steps may be added to method 124 or other methods described herein in order to achieve the same or comparable functionality. In some implementations, one or more steps are omitted. For example, in some implementations, block 126 of determining a number of controllers in an NAS controller cluster can be omitted from method 124. It is appreciated that blocks corresponding to additional or alternative functionality of other implementations described herein can be incorporated in method 124. For example, blocks corresponding to the functionality of various aspects of a controller, a network, or other component otherwise described herein can be incorporated in method 124 even if such functionality is not explicitly characterized herein as a block in a method.

Figure 4:
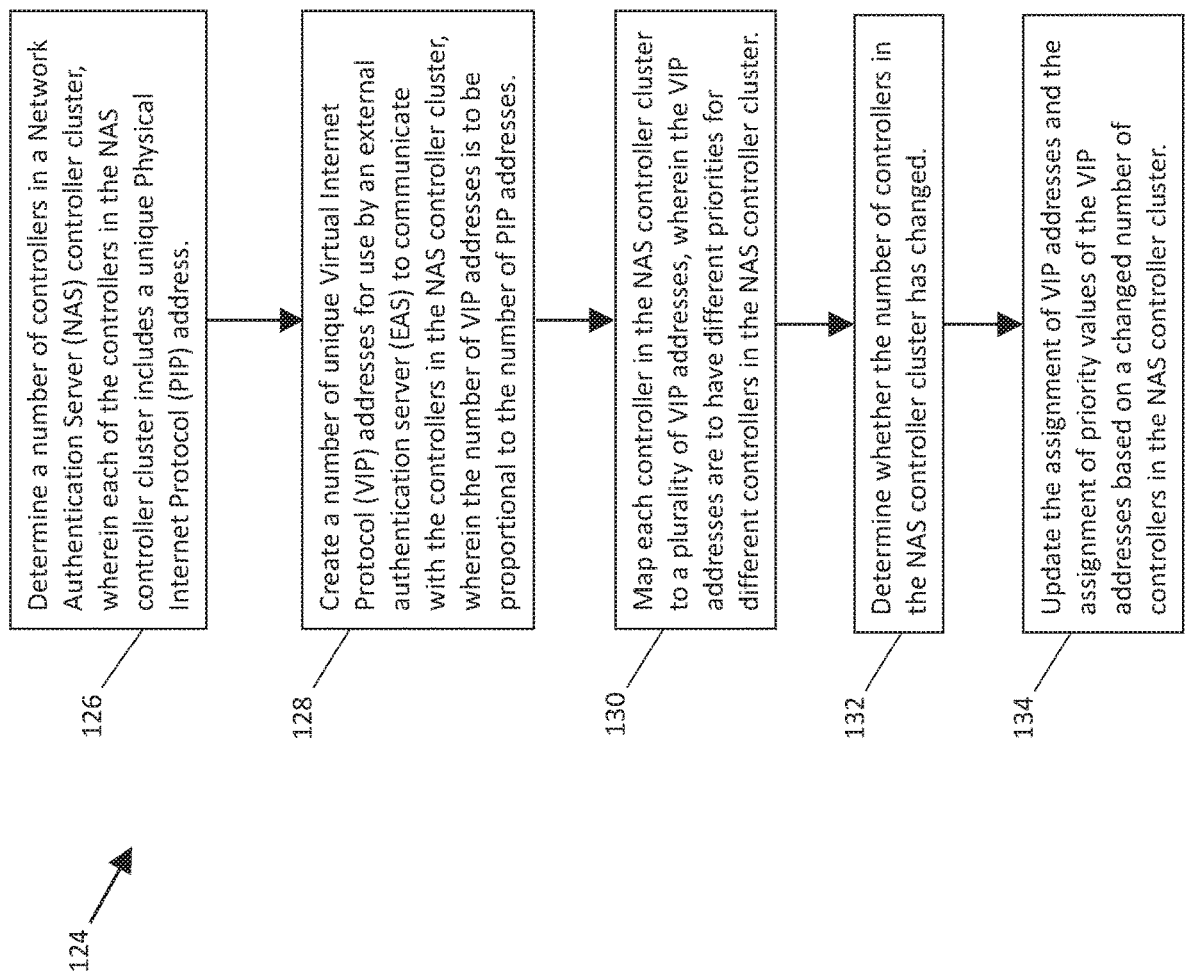
FIG. 4 is a flowchart for a method, according to another example.

FIG. 4 illustrates another example of method 124 in accordance with the present disclosure. For illustration, FIG. 4 reproduces various blocks from method 124 of FIG. 2, however it is appreciated that method 124 of FIG. 4 can include additional, alternative, or fewer steps, functionality, etc., than method 124 of FIG. 2 and is not intended to be limited by the diagram of FIG. 2 (or vice versa) or the related disclosure thereof. It is further appreciated that method 124 of FIG. 2 can incorporate one or more aspects of method 124 of FIG. 4 and vice versa. For example, in some implementations, method 124 of FIG. 2 can include the additional step described below with respect to method 124 of FIG. 4.

Method 124 of FIG. 4 includes determining (at block 132) whether the number of controllers in the NAS controller cluster has changed. In some implementations, block 132 can include being notified that a controller in the NAS controller cluster has failed. The term "being notified" as used herein can, for example, refer to the receipt of a message sent to one or more controllers. In some implementations, "being notified" can occur when a message is not received by a given controller. For example, in some implementations, a failed controller may fail to send a heartbeat message to one or more controllers on a regular basis, such as every 60 seconds. In such a situation, the failure to receive such a message may signal to a controller that the number of controllers in the controller cluster has changed. Further, in some implementations, the term "being notified" may refer to a controller that is interfaced by a network administrator (or other entity) to manually or automatically update the controller to reflect a change in a number of controllers in the cluster.

Method 124 of FIG. 4 includes updating (at block 134) the assignment of VIP addresses and the assignment of priority values of the VIP addresses based on a changed number of controllers in cluster 110. As provided above with respect to FIG. 3, in some implementations, the number of VIP addresses can be proportional to the number of PIP addresses and the exact number of VIP addresses to be created can be determined to optimize administrative load, scalability, or other factors.

An example implementation will now be described. It is appreciated that this implementation may include certain aspects of other implementations described herein (and vice-versa), but it is not intended to be limiting towards other implementations described herein. Some example implementations of method 124 can provide for a redundant design of cluster controllers in handling external authentication server interactions. In this example implementation, multiple controllers are deployed in a cluster environment using an active-active (load-sharing) model to provide redundancy for APs and clients. For each client, an active controller and a standby controller are assigned. The active controller, acting as NAS, is programmed to perform client authentication against an external authentication server. During this authentication process, the active controller notifies the NAS IP address to the authentication server.

In this example Implementation, N VIP addresses may be created for a cluster including N controllers, with each controller internally managing N instances of VRRP—one for each VIP. The VRRP priority assignments can ensure that each controller is the master for a unique VIP, which the controller uses as a NAS IP address while performing client authentication against external authentication servers. As part of client state sync from active controller to standby controller, the NAS IP address used for client authentication can be synced. Upon failover, the standby controller can continue to use this NAS IP address while communicating to the external server. The VRRP protocol can ensure that packets originated from the external server will reach one of the cluster controllers, which will then forward this request to the appropriate controller where the client is currently present.

The above configuration may be applied on all the controllers in the cluster. Each node may then perform the following: (1) sort the PIPs present in the configuration in increasing order; (2) sort the VIPs in increasing order; (3) pair up each PIP with VIP on a 1:1 basis in the sorted order; and (4) assigns a VRRP priority for each controller in the cluster corresponding to each VIP such that the controller whose PIP is paired up with a particular VIP gets the max VRRP priority of 255 for that VIP. The remaining controllers may be assigned priorities in decreasing order in a round robin manner for that VIP. This implementation can be used to maintain a maximum amount of transaction parallelism (such as over RADIUS protocol) between N controllers and M external authentication servers in a controller cluster with an active:active load-sharing operational model.

A specific example will now be provided. In this example, there are 3 controllers in a given cluster, namely, C1, C2 and C3. The PIPs are PIP1, PIP2 and PIP3 for C1, C2 and C3 respectively. The VIPs are VIP1, VIP2 and VIP3. Each node sorts the PIPs of controllers in cluster (for purposes of this example, the sorted order is PIP1, PIP2, PIP3—but the order may be different). Each node also sorts the VIPs (for purposes of this example, the sorted order is VIP1, VIP2, VIP3—but the order may be different). Now each PIP is paired up with a unique VIP and so the pairs are (PIP1, VIP1), (PIP2, VIP2), (PIP3, VIP3).

In this specific example, the VRRP priorities may be assigned such that corresponding to VIP1, VRRP priority of C1 is 255, that of C2 is 245 (i.e. 255–10) and that of C3 is 235 (i.e. 245–10). Corresponding to VIP2, VRRP priority of C2 is 255, that of C3 is 245 (i.e. 255–10) and that of C1 is 235 (i.e. 245–10). Corresponding to VIP3, VRRP priority of C3 is 255, that of C1 is 245 (i.e. 255–10) and that of C2 is 235 (i.e. 245–10). In this example, each node assigns a VRRP ID (virtual router id) corresponding to each VIP starting from a predefined ID based on the sorted order of VIPs. This way, each node will assign the same VRRP ID for a given VIP. That is a deterministic approach to assigning VRRP priorities and VRRP ids for each VIP on every controller in the cluster.

In this specific example, the VRRP IDs are computed independently by each node without exchanging any other data. This can allow for a customer to avoid having to configure N VRRP instances completely for a cluster of size N and thus may simplify cluster configuration. With the computed VRRP priority and VRRP ID assignments for each VIP, this example runs N instances of VRRP (one for each VIP assuming an N node cluster). In our example above, there are 3 instances of VRRP, 1 each for VIP1, VIP2 and VIP3.

In this specific example, for a given client, the active controller may be C2 and the standby controller may be C1. C2, in its transactions with the external authentication server, will specify the NAS IP address as VIP2 (since VIP2 is owned by C2). The external server, in its client database, will map VIP2 as the NAS IP address for this client. As part of client state sync from C2 (standby controller) to C1

(active controller), we sync the NAS IP used for this client (i.e. VIP2). Should C2 go down, then C1, being the standby controller for this client, takes over the client. In all its future transactions with the external authentication server pertaining to this client, C1 will continue to use VIP2 as the NAS IP address, which is consistent with what is known to the external server.

Also, after C2 is detected to be down, C3 having the second highest priority for VIP2 will take ownership of VIP2 as part of the VRRP protocol. Any request such as RADIUS CoA/Disconnect or XML add/delete/authenticate originating from the external authentication server destined to VIP2 will now be sent to C3. C3, as part of cluster operation, knows that the client is on C1 and will thus forward the request from the external server to C1 and thus C1 takes the necessary action by changing the client state/property depending on the request from the external server.

Figure 5:
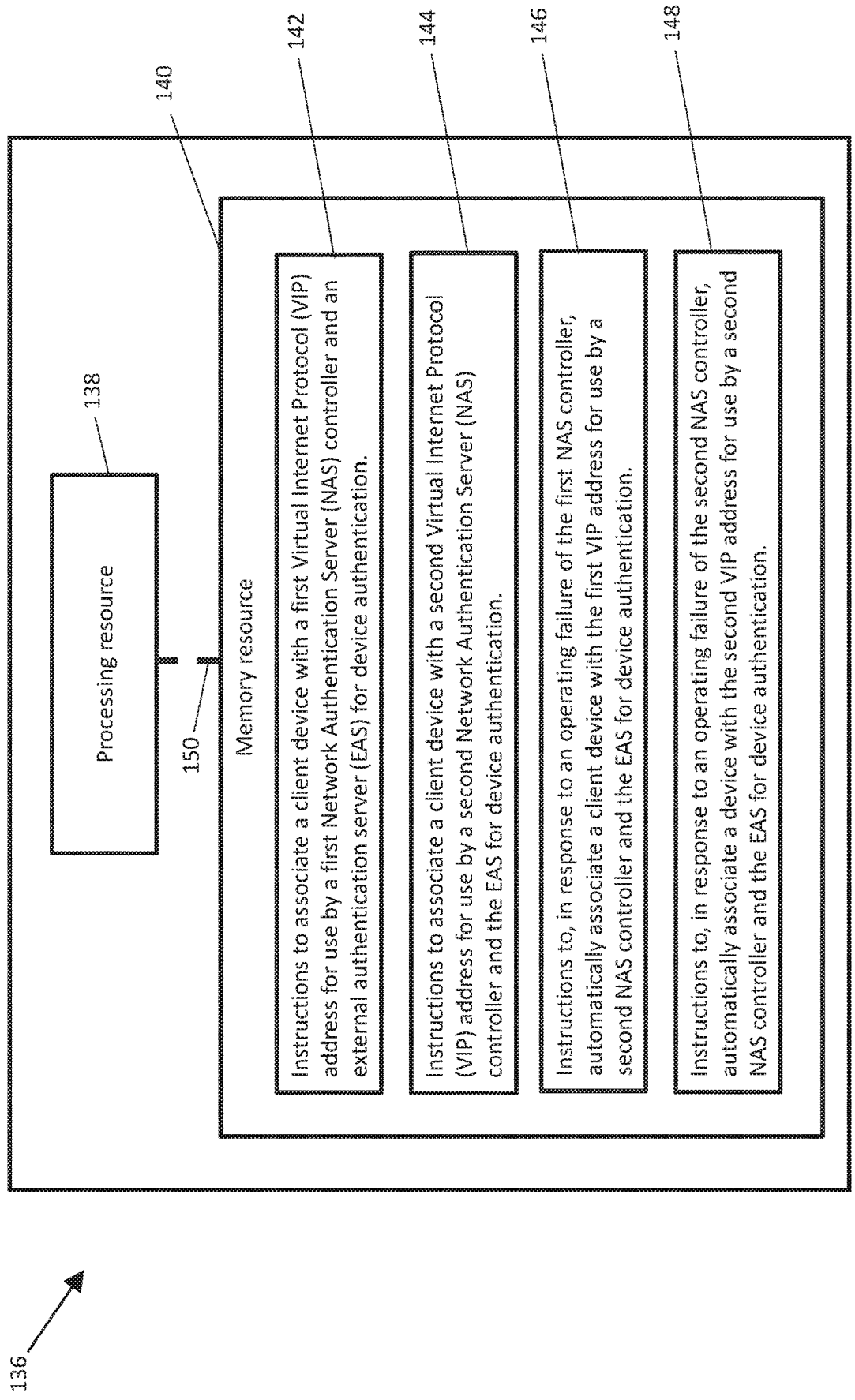
FIG. 5 is a diagram of a system, according to an example.

FIG. 5 is a diagram of a system 136 in accordance with the present disclosure. As described in further detail below, system 136 includes a processing resource 138 and a memory resource 140 that stores machine-readable instructions 142 and 144. For illustration, the description of system 136 of FIG. 5 makes reference to various aspects of the diagram of FIG. 1 as well as to method 124 of FIGS. 2 and 4. Indeed, for consistency and clarity in description, the same reference number for controller 102 of FIG. 1 is used for system 136 of FIG. 5. However it is appreciated that system 136 can include additional, alternative, or fewer aspects, functionality, etc., than the implementation described with respect to method 124 as well as controller 102 of FIG. 1 and is not intended to be limited by the related disclosure thereof.

Instructions 142 stored on memory resource 140 are, when executed by processing resource 138, to cause processing resource 138 to associate a client device (client 1 at 112 in this example) with a first VIP address for use by a first NAS controller (controller 102 in this example) and an EAS (EAS 108 in this example) for device authentication. Instructions 142 can incorporate one or more aspects of blocks of method 124 or another suitable aspect of other implementations described herein (and vice versa).

Instructions 144 stored on memory resource 140 are, when executed by processing resource 138, to cause processing resource 138 to associate a client device (client 1 at 112 in this example) with a second VIP address for use by a second NAS controller (controller 102 in this example) and EAS 108 for device authentication. Instructions 144 can Incorporate one or more aspects of blocks of method 124 or another suitable aspect of other implementations described herein (and vice versa).

Instructions 146 stored on memory resource 140 are, when executed by processing resource 138 and in response to an operating failure of first NAS controller 102, to automatically associate client device 112 with the first VIP address for use by second NAS controller 104 and EAS 108 for device authentication. Likewise, instructions 148 stored on memory resource 140 are, when executed by processing resource 138 and in response to an operating failure of second NAS controller 104, to automatically associate client device 112 with the second VIP address for use by second NAS controller 104 and EAS 108 for device authentication. It is appreciated that automatically associating a client device with a VIP address includes selecting a VIP address to use based on a first priority value for a first VIP address and a second priority value for a second VIP address. Instructions 146 and 148 can incorporate one or more aspects of blocks of method 124 or another suitable aspect of other implementations described herein (and vice versa).

Processing resource 138 of system 136 can, for example, be in the form of a central processing unit (CPU), a semiconductor-based microprocessor, a digital signal processor (DSP) such as a digital image processing unit, other hardware devices or processing elements suitable to retrieve and execute instructions stored in memory resource 140, or suitable combinations thereof. Processing resource 138 can, for example, include single or multiple cores on a chip, multiple cores across multiple chips, multiple cores across multiple devices, or suitable combinations thereof. Processing resource 138 can be functional to fetch, decode, and execute instructions as described herein. As an alternative or in addition to retrieving and executing instructions, processing resource 138 can, for example, include at least one integrated circuit (IC), other control logic, other electronic circuits, or suitable combination thereof that include a number of electronic components for performing the functionality of instructions stored on memory resource 140. The term "logic" can, in some implementations, be an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Processing resource 138 can, for example, be implemented across multiple processing units and instructions may be implemented by different processing units in different areas of system 136.

Memory resource 140 of system 136 can, for example, be in the form of a non-transitory machine-readable storage medium, such as a suitable electronic, magnetic, optical, or other physical storage apparatus to contain or store information such as machine-readable instructions 142, 144, 146, and 148. Such instructions can be operative to perform one or more functions described herein, such as those described herein with respect to method 124 or other methods described herein. Memory resource 140 can, for example, be housed within the same housing as processing resource 138 for system 136, such as within a computing tower case for controller 102 (in implementations where system 136 is in the form of controller 102 and is housed within a computing tower case). In some implementations, memory resource 140 and processing resource 138 are housed in different housings. As used herein, the term "machine-readable storage medium" can, for example, include Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. In some implementations, memory resource 140 can correspond to a memory including a main memory, such as a Random Access Memory (RAM), where software may reside during runtime, and a secondary memory. The secondary memory can, for example, include a nonvolatile memory where a copy of machine-readable instructions are stored. It is appreciated that both machine-readable instructions as well as related data can be stored on memory mediums and that multiple mediums can be treated as a single medium for purposes of description.

Memory resource 140 can be in communication with processing resource 138 via a communication link 150. Each communication link 150 can be local or remote to a machine (e.g., a computing device) associated with processing resource 138. Examples of a local communication link 150 can include an electronic bus internal to a machine (e.g., a computing device) where memory resource 140 is one of volatile, nonvolatile, fixed, and/or removable storage medium in communication with processing resource 138 via the electronic bus.

In some implementations, one or more aspects of system 136 (as well as other devices of network 100) can be in the form of functional modules that can, for example, be operative to execute one or more processes of instructions 142, 144, 146, and 148 or other functions described herein relating to other implementations of the disclosure. As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software can include hardware only (i.e., a hardware element with no software elements), software hosted at hardware (e.g., software that is stored at a memory and executed or interpreted at a processor), or hardware and software hosted at hardware. It is further appreciated that the term "module" is additionally intended to refer to one or more modules or a combination of modules. Each module of system 136 can, for example, include one or more machine-readable storage mediums and one or more computer processors.

In view of the above, it is appreciated that the various instructions of system 136 described above can correspond to separate and/or combined functional modules. For example, instructions 142 can correspond to a "first NAS controller association module" to associate a client device with a first VIP address for use by a first NAS controller and instructions 146 can correspond to a "second NAS controller association module" to associate the client device with a first VIP address for use by the second NAS controller. It is further appreciated that a given module can be used for multiple functions. As but one example, in some implementations, a single module can be used to associate a client device with a first VIP (e.g., corresponding to the instructions 142) and to associate a client device with a second VIP (e.g., corresponding to the instructions 144).

One or more nodes within network 100 (e.g., controllers 102, 104, 106, EAS 108, etc.) can further include a suitable communication module to allow networked communication between elements of network 100. Such a communication module can, for example, include a network interface controller having an Ethernet port and/or a Fibre Channel port. In some implementations, such a communication module can include wired or wireless communication interface, and can, in some implementations, provide for virtual network ports. In some implementations, such a communication module includes hardware in the form of a hard drive, related firmware, and other software for allowing the hard drive to operatively communicate with other hardware of controllers or other network equipment. The communication module can, for example, include machine-readable instructions for use with communication the communication module, such as firmware for implementing physical or virtual network ports.

Figure 6:
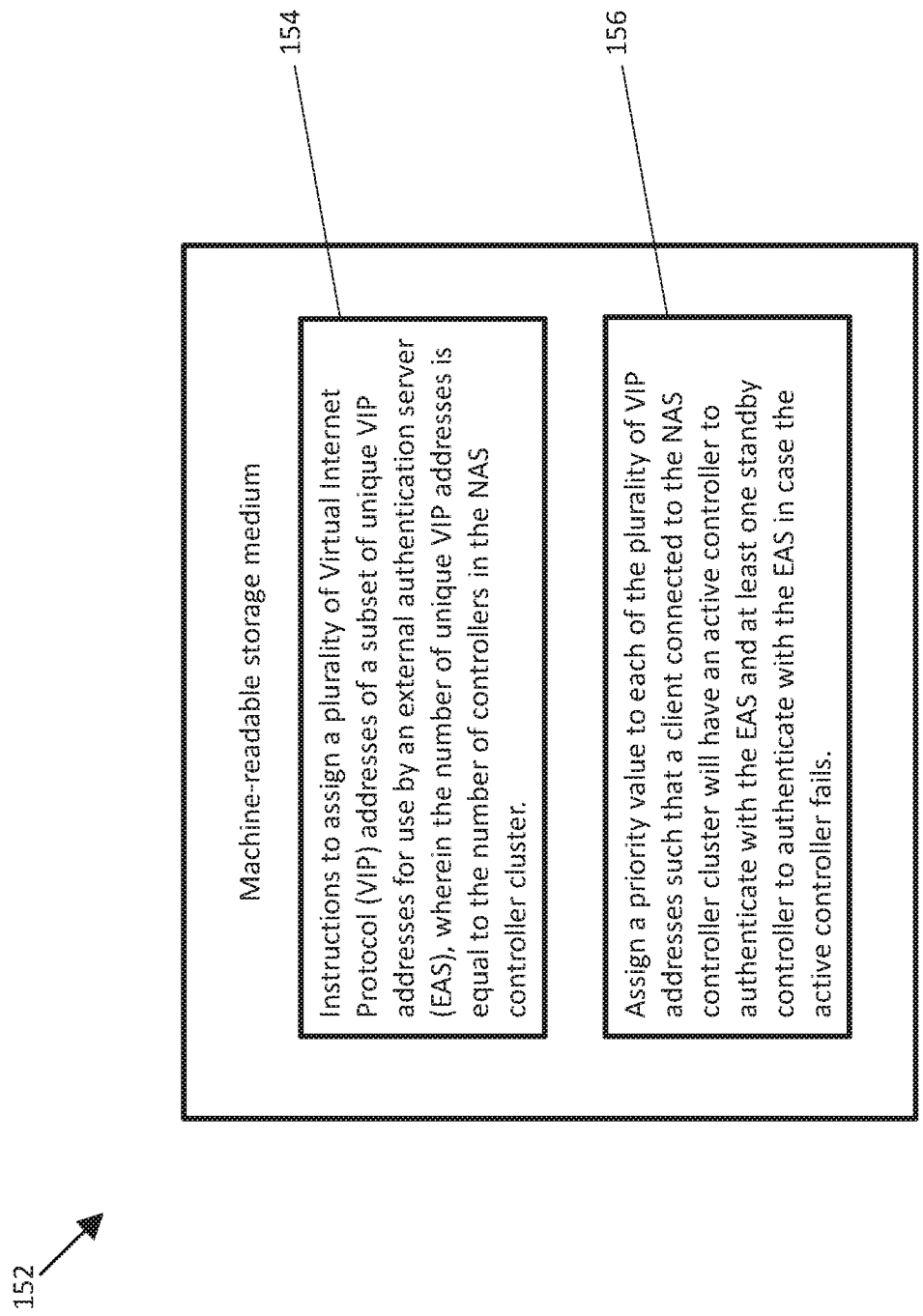
FIG. 6 is a diagram of machine-readable storage medium, according to an example.

FIG. 6 illustrates a machine-readable storage medium 152 including various instructions that can be executed by a computer processor or other processing resource. In some implementations, medium 152 can be housed within a controller, such as controller 102, or on another computing device within network 100 or in local or remote wired or wireless data communication with network 100.

For illustration, the description of machine-readable storage medium 152 provided herein makes reference to various aspects of controller 102 (e.g., processing resource 138) and other implementations of the disclosure (e.g., method 124). Although one or more aspects of controller 102 (as well as instructions such as instructions 142, 144, 146, and 148) can be applied or otherwise incorporated with medium 152, it is appreciated that in some implementations, medium 152 may be stored or housed separately from such a system. For example, in some implementations, medium 152 can be in the form of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof.

Medium 152 includes machine-readable instructions 154 stored thereon to cause processing resource 138 to assign a plurality of VIP addresses of a subset of unique VIP addresses for use by an EAS, wherein the number of unique VIP addresses is equal to the number of controllers in the NAS controller cluster. Instructions 154 can, for example, incorporate one or more aspects of method 124 or another suitable aspect of other implementations described herein (and vice versa). Medium 152 further includes machine-readable instructions 156 stored thereon to assign a priority value to each of the plurality of VIP addresses such that a client connected to the NAS controller cluster will have an active controller to authenticate with the EAS and at least one standby controller to authenticate with the EAS in case the active controller fails. Instructions 156 can, for example, incorporate one or more aspects of method 124 or another suitable aspect of other implementations described herein (and vice versa).

Figure 7:
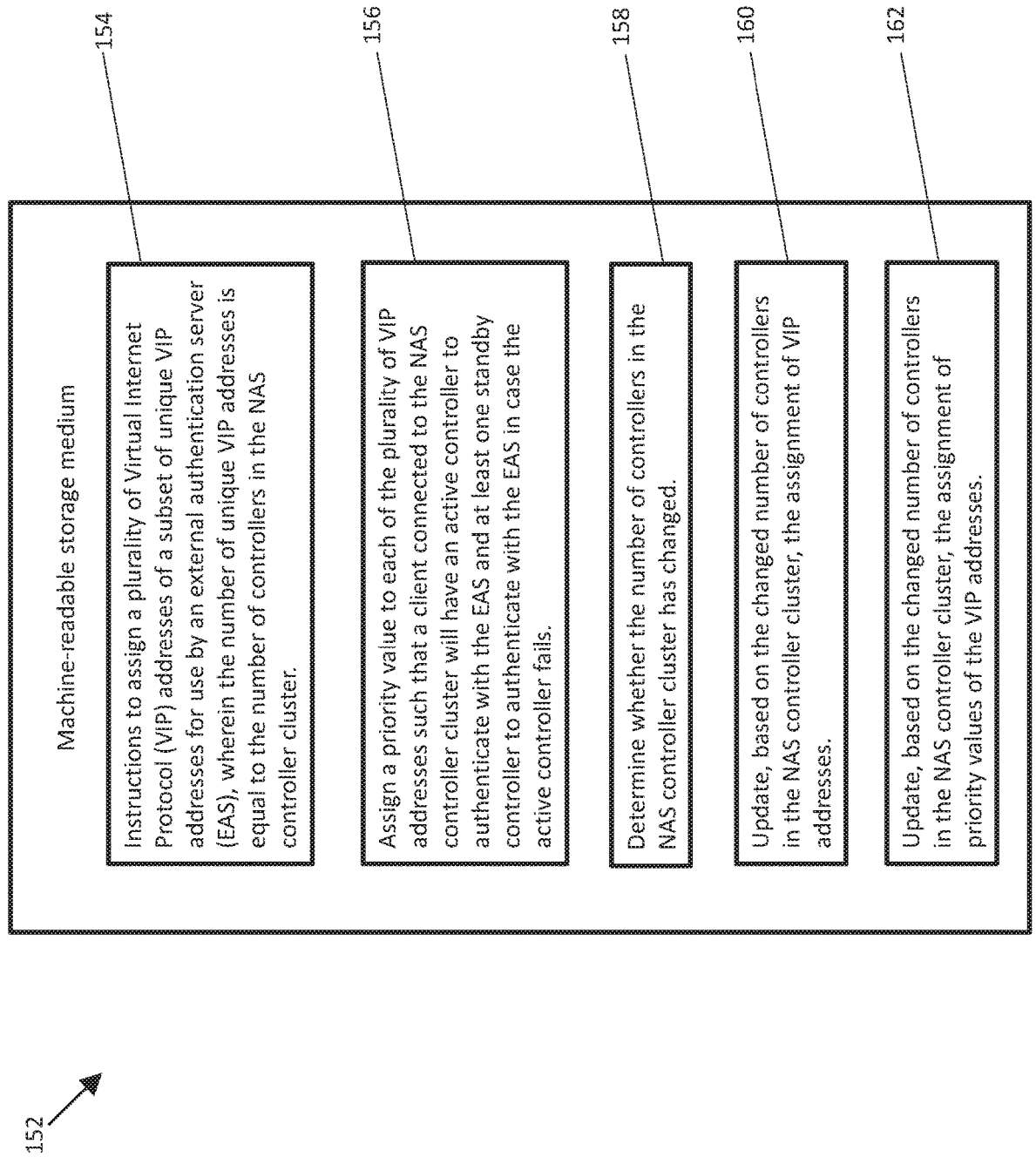
FIG. 7 is a diagram of machine-readable storage medium, according to another example.

FIG. 7 illustrates another example machine-readable storage medium 152 including various instructions that can be executed by a computer processor or other processing resource. In some implementations, medium 152 can be housed within a controller, such as controller 102, or on another computing device within network 100 or in local or remote wired or wireless data communication with network 100. In addition to instructions 154 and 156 described above with respect to FIG. 6, medium 152 can include instructions 158, 160, and 162 as described below.

Medium 152 includes machine-readable instructions 158 stored thereon to cause processing resource 138 to determine whether the number of controllers in the NAS controller cluster has changed. Instructions 158 can, for example, incorporate one or more aspects of method 124 or another suitable aspect of other implementations described herein (and vice versa). Medium 152 further includes machine-readable instructions 160 stored thereon to cause processing resource 138 to update, based on the changed number of controllers in the NAS controller cluster, the assignment of VIP addresses. Instructions 160 can, for example, incorporate one or more aspects of method 124 or another suitable aspect of other implementations described herein (and vice versa). Medium 152 further includes machine-readable instructions 162 stored thereon to cause processing resource 138 to update, based on the changed number of controllers in the NAS controller cluster, the assignment of priority values of the VIP addresses. Instructions 162 can, for example, incorporate one or more aspects of method 124 or another suitable aspect of other implementations described herein (and vice versa).

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

As used herein, "logic" is an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

What is claimed is:

1. A method comprising:
   determining a number of controllers in a Network Authentication Server (NAS) controller cluster, wherein each of the controllers in the NAS controller cluster includes a unique Physical Internet Protocol (PIP) address;
   creating a number of unique Virtual Internet Protocol (VIP) addresses for use by an external authentication server (EAS) to communicate with the controllers in the NAS controller cluster, wherein the number of VIP addresses is to be proportional to the number of PIP addresses; and
   mapping each controller in the NAS controller cluster to a plurality of VIP addresses, wherein the VIP addresses are to have different priorities for different controllers in the NAS controller cluster,
   wherein creating the number of unique VIP addresses includes creating the number of VIP addresses based on a number of allowable concurrent transactions for a given EAS from a single Internet Protocol (IP) address.

2. The method of claim 1, wherein creating the number of unique VIP addresses includes creating the number of VIP addresses to be equal to the number of PIP addresses.

3. The method of claim 1, wherein creating the number of unique VIP addresses includes creating the number of VIP addresses to be less than the number of PIP addresses.

4. The method of claim 1, wherein creating the number of unique VIP addresses includes dynamically creating the number of VIP addresses such that the number of concurrent transactions for the given EAS from the single Internet Protocol (IP) address is to be less than the number of allowable current transactions for the given EAS.

5. The method of claim 1, wherein a first controller in the NAS controller cluster is to communicate with the EAS to provide network authentication services for a client device in communication with the first controller.

6. The method of claim 5, wherein the client device is connected to the first controller as an active controller to authenticate with the EAS and connected to a second controller as a standby controller to authenticate with the EAS in case the first controller fails.

7. The method of claim 1, wherein the VIP addresses are to have different priorities for different controllers in the NAS controller cluster such that a client connected to multiple controllers in the NAS controller cluster is assigned to only a single active controller to provide network authentication services.

8. The method of claim 1, wherein each controller in the NAS controller cluster is to determine the different priorities of the VIP addresses mapped to itself.

9. The method of claim 1, further comprising:
   determining whether the number of controllers in the NAS controller cluster has changed; and
   updating the assignment of VIP addresses and the assignment of priority values of the VIP addresses based on a changed number of controllers in the NAS controller cluster.

10. The method of claim 9, further comprising:
    wherein determining whether the number of controllers in the NAS controller cluster has changed includes being notified that a controller in the NAS controller cluster has failed.

11. A non-transitory machine readable storage medium having stored thereon machine readable instructions to cause a computer processor to:
    assign a plurality of Virtual Internet Protocol (VIP) addresses of a subset of unique VIP addresses for use by an external authentication server (EAS), wherein the number of unique VIP addresses is equal to the number of controllers in the NAS controller cluster; and
    assign a priority value to each of the plurality of VIP addresses such that a client connected to the NAS controller cluster will have an active controller to authenticate with the EAS and at least one standby controller to authenticate with the EAS in case the active controller fails,
    wherein a number of the plurality of VIP addresses is based on a number of allowable concurrent transactions for a given EAS from a single Internet Protocol (IP) address.

12. The medium of claim 11, wherein the machine readable instructions are to cause a computer processor to:
    determine whether the number of controllers in the NAS controller cluster has changed; and
    update, based on the changed number of controllers in the NAS controller cluster, the assignment of VIP addresses;
    update, based on the changed number of controllers in the NAS controller cluster, the assignment of priority values of the VIP addresses.

13. The medium of claim 11, wherein the machine readable instructions to assign the plurality of VIP addresses comprise instructions to cause the processing resource to:
    create the subset of unique VIP addresses for use by the EAS to communicate with the controllers the NAS controller cluster; and
    map each controller in the NAS controller cluster to the plurality of VIP addresses, wherein the VIP addresses have different priorities values for different controllers in the NAS controller cluster.

14. The medium of claim 13, wherein the machine readable instructions to create the subset of unique VIP addresses comprise instructions to cause the processing resource to:
    dynamically create the number of VIP addresses such that a number of concurrent transactions for the given EAS from the single IP address is less than the number of allowable current transactions for the given EAS.

15. The medium of claim 13, wherein each controller in the NAS controller cluster determines the different priority values of the VIP addresses mapped to itself.

16. A system comprising:
a processing resource and
a memory resource storing machine readable instructions to cause the processing resource to:
- associate a client device with a first Virtual Internet Protocol (VIP) address for use by a first Network Authentication Server (NAS) controller and an external authentication server (EAS) for device authentication;
- associate the client device with a second Virtual Internet Protocol (VIP) address for use by a second NAS controller and the EAS for device authentication;
- in response to an operating failure of the first NAS controller, automatically associate the client device with the first VIP address for use by the second NAS controller and the EAS for device authentication; and
- in response to an operating failure of the second NAS controller, automatically associate the client device with the second VIP address for use by the second NAS controller and the EAS for device authentication,
- wherein automatically associating the client device with the first VIP address includes selecting the first VIP address to use based on a first priority value for the first VIP address and a second priority value for the second VIP address, wherein each of the first and second NAS controllers determines the priority value of each VIP address mapped to itself.

17. The system of claim 16, wherein the machine readable instructions comprise instructions to cause the processing resource to:
communicate between the first NAS controller and the EAS to provide network authentication services for the client device.

18. The system of claim 16, wherein the client device is connected to the first NAS controller as an active controller to authenticate with the EAS and connected to the second NAS controller as a standby controller to authenticate with the EAS in case the first controller fails.

19. The system of claim 16, wherein the first priority value of the first VIP address and the second priority value of the second VIP address are selected such that the client is assigned to only a single active controller to provide network authentication services.

20. The system of claim 16, wherein the machine readable instructions comprise instructions to cause the processing resource to:
- determine whether a number of controllers in a NAS controller cluster has changed, wherein the NAS controller cluster includes the first NAS controller and the second NAS controller; and
- update the assignment of VIP addresses and the assignment of priority values of the VIP addresses based on a changed number of controllers in the NAS controller cluster.

* * * * *